(12) United States Patent
Jang

(10) Patent No.: US 6,920,344 B2
(45) Date of Patent: Jul. 19, 2005

(54) PORTABLE COMMUNICATION DEVICE FOR MINIMIZING SPECIFIC ABSORPTION RATE (SAR) VALUE OF ELECTROMAGNETIC WAVES

(75) Inventor: Chang-Weon Jang, Kumi-shi (KR)

(73) Assignee: Samsung Electronics Co., Ltd. (KR)

( * ) Notice: Subject to any disclaimer, the term of this patent is extended or adjusted under 35 U.S.C. 154(b) by 518 days.

(21) Appl. No.: 09/989,924

(22) Filed: Nov. 21, 2001

(65) Prior Publication Data
US 2002/0187806 A1 Dec. 12, 2002

(30) Foreign Application Priority Data
Jun. 7, 2001 (KR) ......................................... 2001-31614

(51) Int. Cl.⁷ .............................................. H04M 1/00
(52) U.S. Cl. ................... 455/575.5; 455/575.1; 455/347; 455/348; 379/433.01; 379/433.07; 379/433.08; 361/816; 361/800; 361/752
(58) Field of Search ...................... 455/575.5, 575.1, 455/90.3, 347, 348, 344, 349, 351; 379/433.08, 433.07, 433.01; 361/816, 800, 752, 700, 736

(56) References Cited

U.S. PATENT DOCUMENTS

| | | | | |
|---|---|---|---|---|
| 5,731,964 A | * | 3/1998 | Kitabuko et al. | ............ 361/816 |
| 6,308,074 B1 | * | 10/2001 | Chandra et al. | ............ 455/462 |
| 6,455,188 B1 | * | 9/2002 | McKay et al. | ................ 429/97 |
| 6,483,719 B1 | * | 11/2002 | Bachman | ..................... 361/816 |
| 6,510,328 B1 | * | 1/2003 | Myllymaki | .............. 455/554.1 |
| 6,724,618 B1 | * | 4/2004 | Jenkins et al. | ............. 361/684 |
| 2001/0021657 A1 | * | 9/2001 | Morita | ....................... 455/550 |
| 2002/0022459 A1 | * | 2/2002 | Kobayashi | .................. 455/90 |

* cited by examiner

*Primary Examiner*—William Trost
*Assistant Examiner*—Danh Le
(74) *Attorney, Agent, or Firm*—Dilworth & Barrese LLP (57) ABSTRACT

There is provided a portable communication device for minimizing the SAR of electromagnetic waves. In the portable communication device, a slim upper housing has an FBC on which a keypad is mounted, a lower housing is vertically spaced from the slim upper housing by a predetermined distance and includes a PCB assembly, and a middle housing is positioned between the slim upper housing and the lower housing, spatially isolated from the lower housing by a separation plate to minimize the adverse effects of electromagnetic waves generated from the PCB assembly, and has a slot opened from the front end to hold an object in the lengthwise direction. A sliding battery pack is insertable to and detachable from the middle housing in the lengthwise direction.

7 Claims, 11 Drawing Sheets

PORTABLE COMMUNICATION DEVICE FOR MINIMIZING SPECIFIC ABSORPTION RATE (SAR) VALUE OF ELECTROMAGNETIC WAVES

PRIORITY

This application claims priority to an application entitled "Portable Communication Device for Minimizing Specific Absorption Rate (SAR) Value of Electromagnetic Waves" filed in the Korean Industrial Property Office on Jun. 7, 2001 and assigned Serial No. 2001-31614, the contents of which are hereby incorporated by reference.

BACKGROUND OF THE INVENTION

1. Field of the Invention

The present invention relates generally to a portable communication device such as a cellular phone or a PDA (Personal Digital Assistant), and in particular, to a portable communication device for minimizing the SAR of electromagnetic waves.

2. Description of the Related Art

A portable communication device generally refers to a portable device like a cellular phone, a PDA, a laptop computer, etc. A mobile station like a cellular phone is a portable terminal that can provide wireless communication services to a user by wirelessly communicating with a base station.

Electronic parts for the portable terminal become smaller and more lightweight along with the present trend of the portable terminal toward high sensitivity and miniaturization. Such portable terminals are classified into a bar type, a flip type, and a folder type according to appearances, or a neck-wearing type and a wrist type according to where they are carried.

Figure 1:
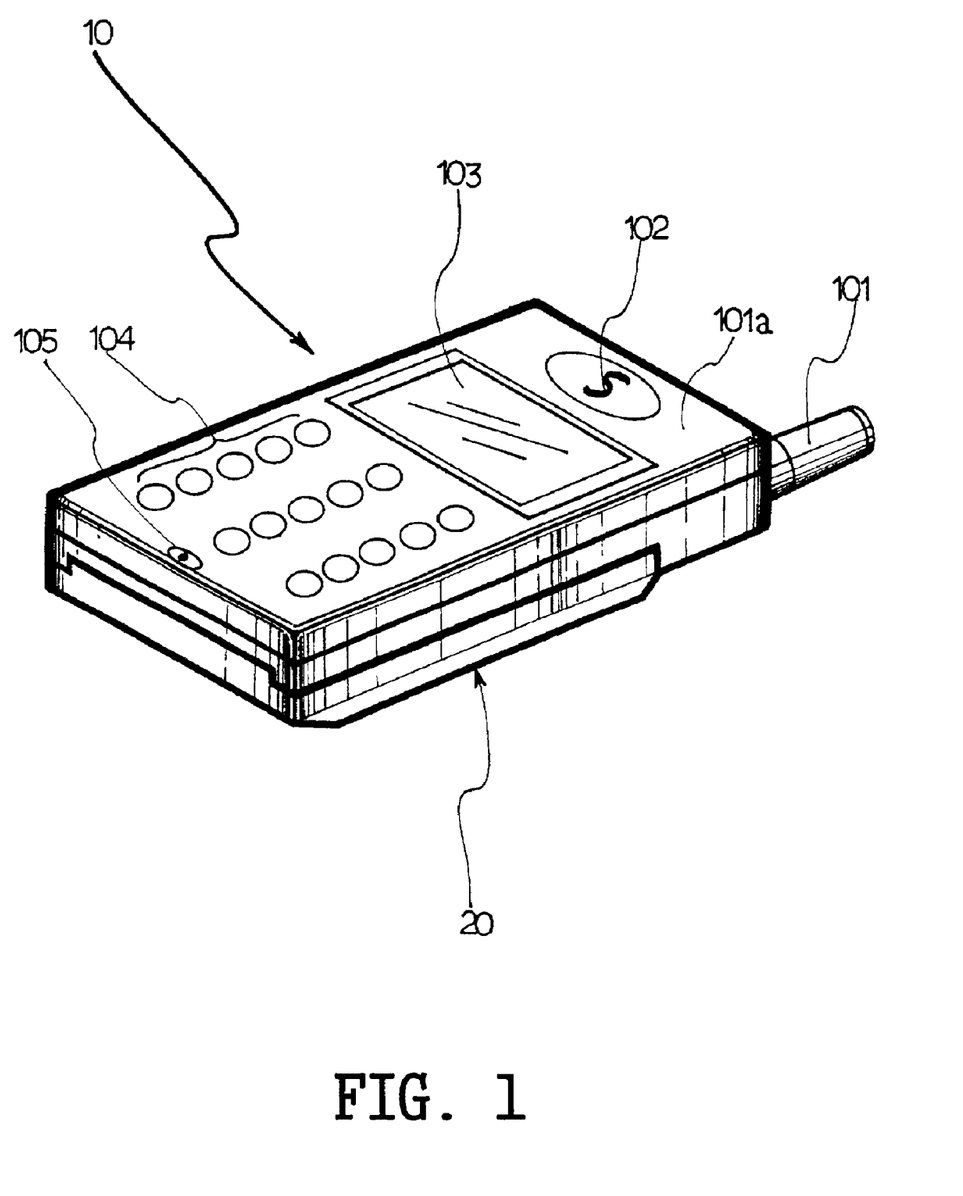
FIG. 1 is a perspective view illustrating the exterior of a conventional cellular phone.

Among popular portable terminals, a cellular phone will be taken as an example. FIG. 1 is a perspective view of a conventional cellular phone and FIG. 2 is a partial cut-out sectional view of the interior stack structure of the conventional cellular phone.

Referring to FIG. 1, the cellular phone includes a data input device 104, a data output device 103, an antenna 101, a transmitter 105, a receiver 102, and a battery pack 20, all of which are contained in a body housing 10. A keypad is usually used as the data input device 104 and an LCD (Liquid Crystal Display) module as the data output device 103. A microphone is used as the transmitter 105 and an earpiece including a speaker is used as the receiver 102. The battery pack 20 is composed of a plurality of battery cells (not shown) and generally detachable from the body housing 10 to be recharged when power is used up.

The data input and output devices 104 and 103, the transmitter 105, the receiver 102, and the antenna 101 are installed at appropriate positions of the body housing 10 and the battery pack 20 is detachably installed under the body housing 10.

Figure 2:
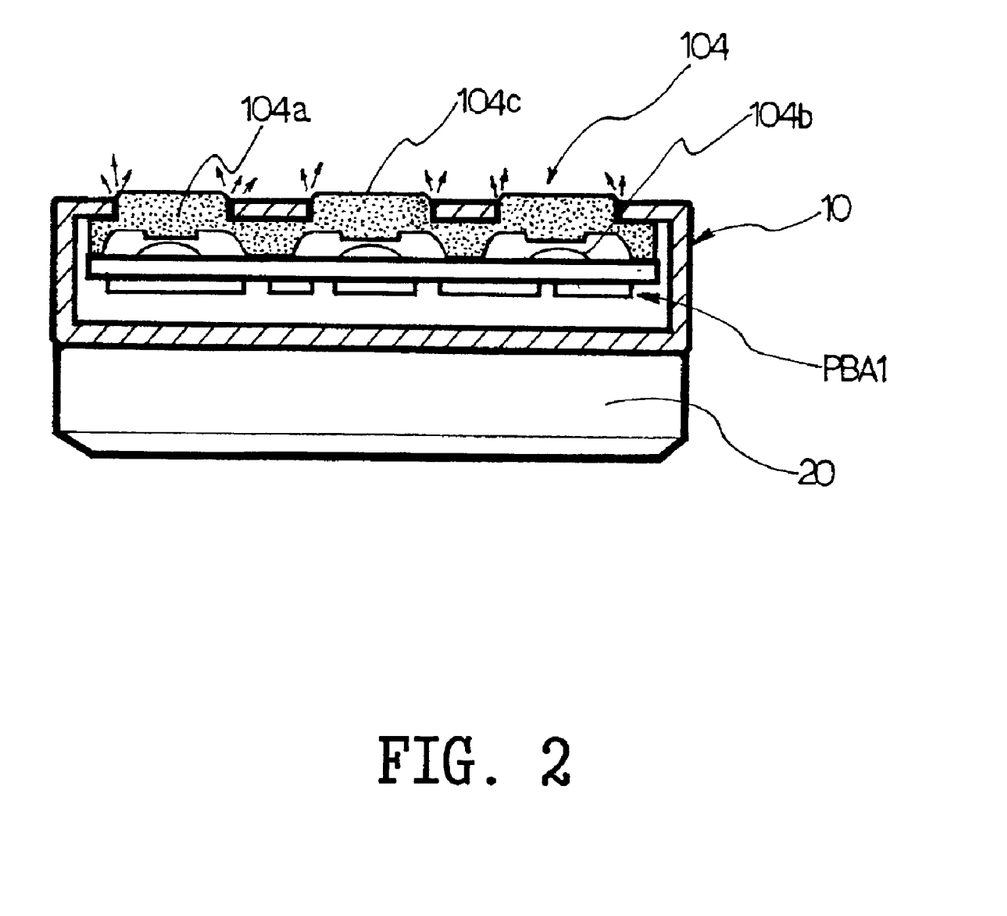
FIG. 2 is a partial cut-out sectional view illustrating the interior stack structure of the conventional cellular phone.

Referring to FIG. 2, the interior structure of the body housing 10 will be described. Along a vertical direction, the keypad 104 and the LCD module, and the transmitter/receiver are disposed on the top end of the body housing 10 and the battery pack is detachably installed on the bottom end of the body housing 10. A PCB (Printed Circuit Board) assembly PBA1 having circuit parts is located between the keypad 104 and the battery pack 20.

The keypad 104 has a plurality of silicon rubber keys 104a with key tops 104c exposed outward from the body housing 10 to be pressed by a user for data entry. Located on PBA1 are a plurality of button switches 104b that correspond to the plurality of rubber keys 104a.

This keypad 104 is connected to the PCB assembly PBA1 to input data a user presses on a key top 104c, which depresses rubber key 104a into switch 104b. The battery pack 20 is detachable from the bottom end of the body housing 10. Connection ports (not shown) are separately provided on the bottom end of the body housing 10 and the top end of the battery pack 20. When the battery pack 20 is mounted to the body housing 10, the connection between the connection ports establish a path for supplying power to the body housing 10, particularly the PCB assembly PBA1.

A key frame for the body housing 10 has a plurality of holes for holding the key tops 104c of the keypad 104. This layout results in the emission of electromagnetic waves from the PCB assembly PBA1 through the holes as shown by the arrows on FIG. 2. The electromagnetic waves of the portable terminal eminate from its PCB assembly with a multitude of circuit parts and chips. Those electromagnetic waves have adverse effects on the human body.

In addition, as the portable communication devices become miniaturized by making them thinner, heat emitted from a PCB assembly in a housing is transferred to the head, ear, mouth, or hand of the user, making it inconvenient to converse on the phone.

SUMMARY OF THE INVENTION

It is, therefore, an object of the present invention to provide a portable communication device with a battery pack located between a keypad and a PCB assembly and removable therefrom.

It is another object of the present invention to provide a portable communication device for minimizing the electromagnetic waves emitted from a PCB.

It is a further object of the present invention to provide a portable communication device with a PCB assembly at a maximum distance from the head of a user during a call, as compared to a conventional portable communication device.

The above and other objects can be achieved by providing a portable communication device. The portable communication device has a body housing and a sliding battery pack. The body housing includes a slim upper housing with an FBC (Flexible Printed Board Circuit) on which a keypad is mounted, a lower housing vertically spaced from the slim upper housing by a predetermined distance and including a PCB assembly, and a middle housing between the slim upper housing and the lower housing, spatially isolated from the lower housing by a separation plate to minimize the adverse effects of electromagnetic waves generated from the PCB assembly, and having a slot opened from the front end to hold an object in the lengthwise direction. The sliding battery pack is insertable to and detachable from the middle housing in the lengthwise direction.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described hereinbelow with reference to the accompanying drawings. In the following description, well-known functions or constructions are not described in detail since they would obscure the invention in unnecessary detail.

Figure 3:
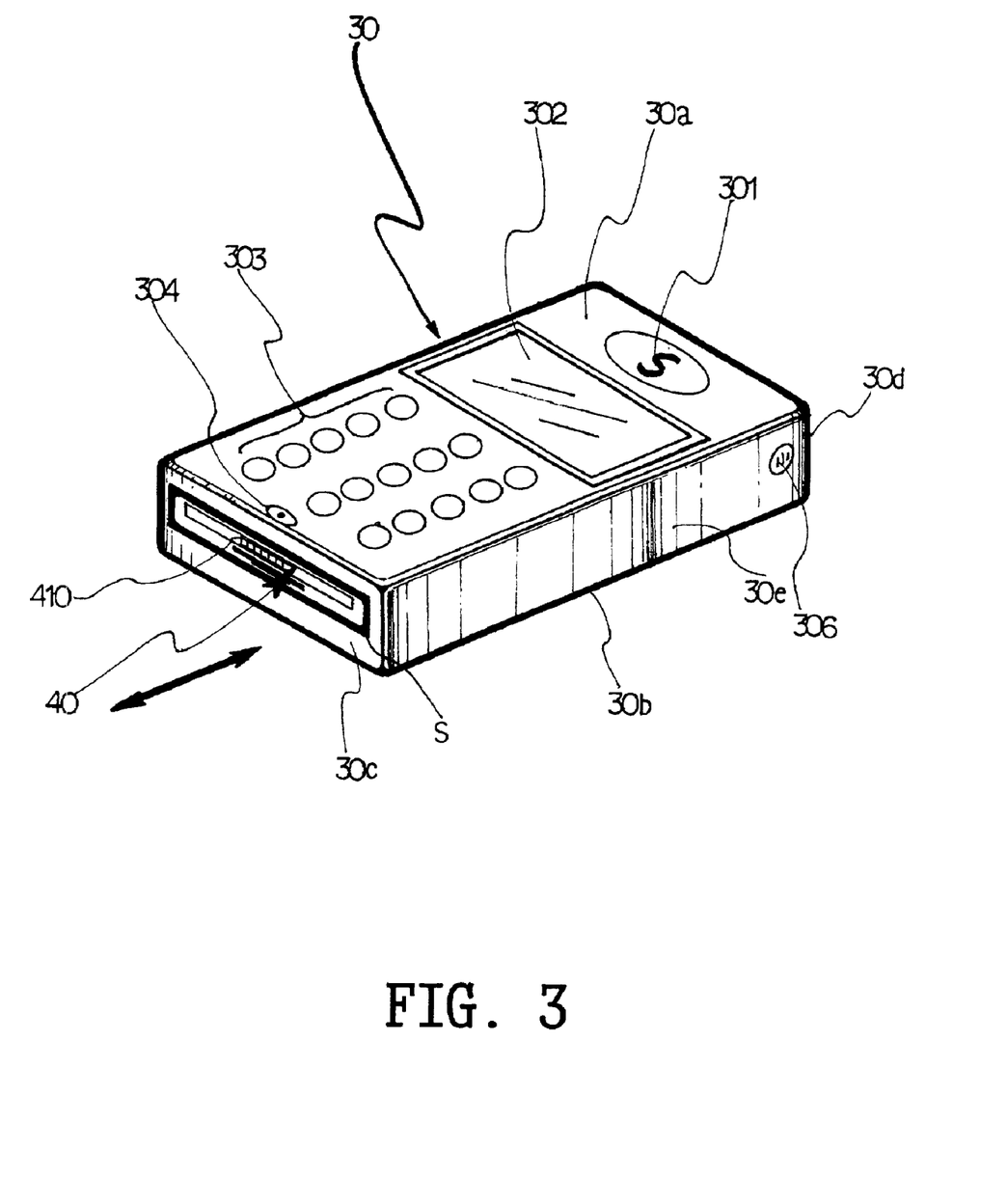
FIG. 3 is a perspective view of a portable communication device with a sliding battery pack according to an embodiment of the present invention.

FIG. 3 is a perspective view of a portable communication device according to the present invention.

Referring to FIG. 3, the portable communication device includes a body housing 30 and a sliding battery pack 40 detachable in a lengthwise direction as indicated by the bi-directional arrow charging port 410 is shown located on the front end of battery pack 40.

The body housing 30 has top and bottom ends 30a and 30b, front and rear ends 30c and 30d, and two side ends 30e and 30g. The sliding battery pack 40 is mounted or detached in the lengthwise direction indicated by the bi-directional arrow.

Figure 4:
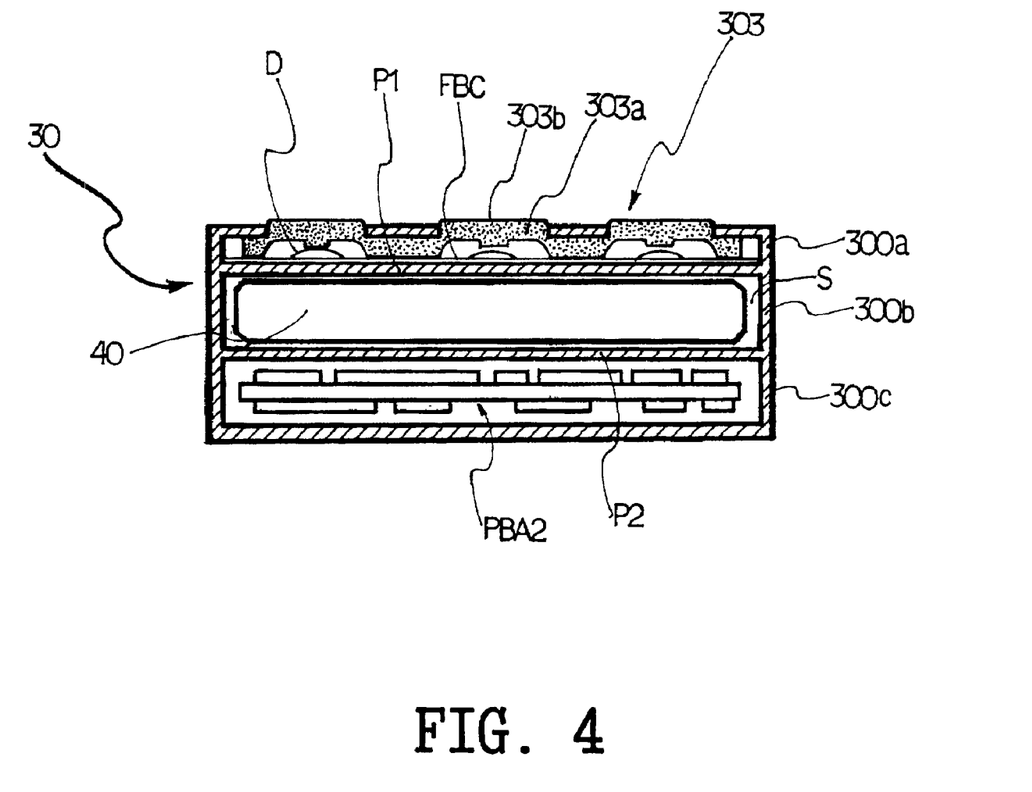
FIG. 4 is a partial cut-out sectional view illustrating the interior stack structure of the portable communication device according to an embodiment of the present invention.

Referring to FIG. 4, the body housing 30 is divided into an upper housing 300a, a lower housing 300c, and a middle housing 300b between the upper and lower housings 300a and 300c, which are separated from one another by separation plates P1 and P2. Especially, the middle housing 300b is entirely isolated from the lower housing 300c by the separation plate P2.

Referring again to FIG. 3 and FIG. 4, an earpiece 301, an LCD module 302, a keypad 303, and a microphone 304 are mounted on the top end 30a of the upper housing 300a, a PCB assembly PBA2 with chips is included in the lower housing 300c, and the middle housing 300b has space for holding the sliding battery pack 40.

The upper housing 300a and the lower housing 300c are formed with a plastic casing frame and the middle housing 300b has an open space, that is, a slot S.

As described before, the keypad 303 is mounted on the upper housing 300a. The keypad 303 includes silicon rubber keys 303a with key tops 303b exposed outward from the top end 30a of the housing 30 and metal domes D which are brought into contact with an FBC (Flexible printed Board Circuit) when the silicon rubber keys 303a are pressed. The silicon rubber keys 303a and the metal domes D are well known to those skilled in the art.

Since the separated upper, middle, and lower housings 300a, 300b, and 300c are integrally formed and especially the middle housing 300b and the lower housing 300c are entirely separated by the separation plate P2, electromagnetic waves adverse to the human body generated from the PCB assembly PBA2 are grounded in the lower housing 300c without penetrating into the middle housing 300b or the upper housing 300a.

Figure 5:
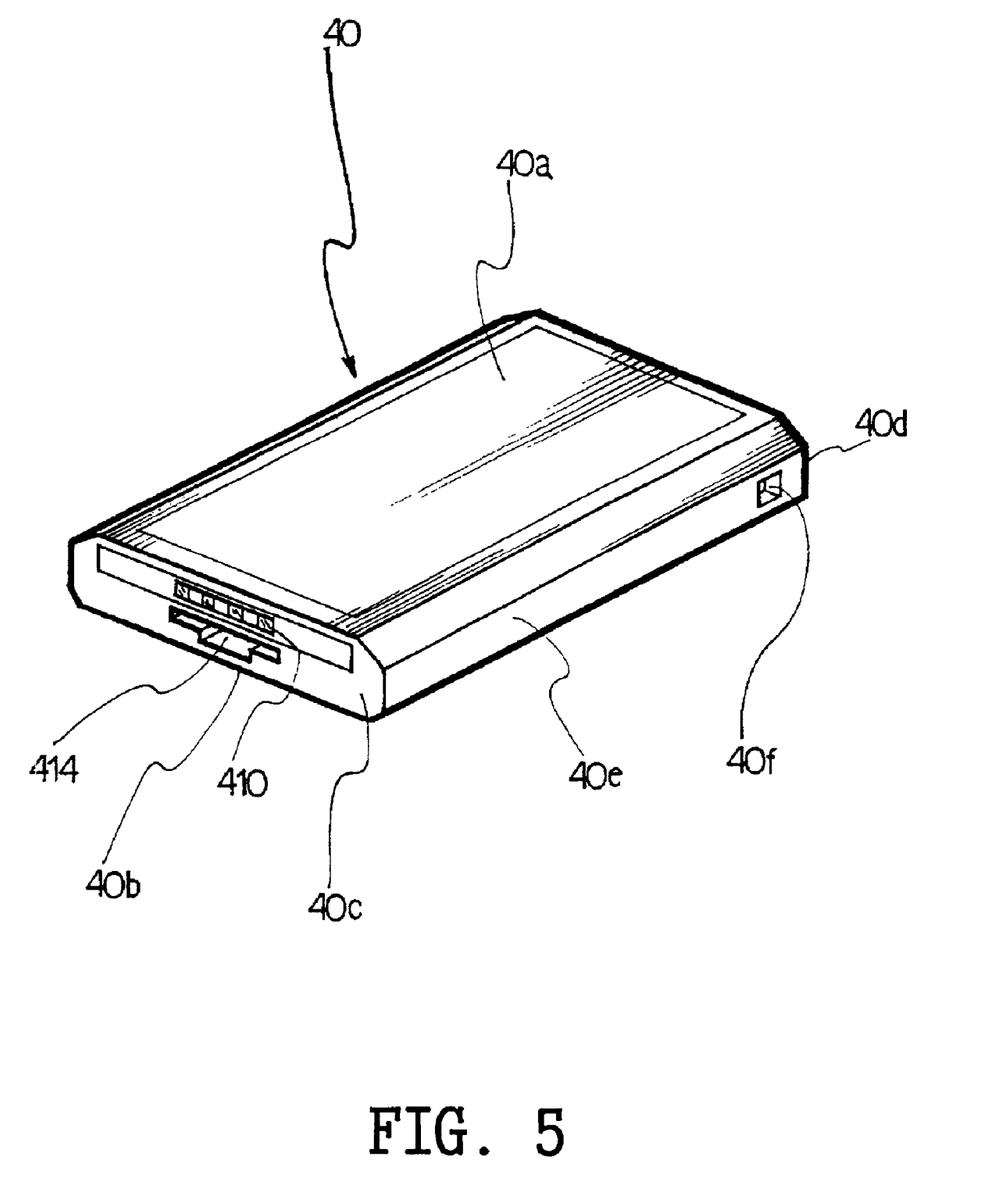
FIG. 5 is a perspective view of an embodiment of a sliding battery pack with a connection port at the front end thereof, insertable/detachable into/from the portable communication device according to an embodiment of the present invention.

Now there will be given a description of the structure of the sliding battery pack detachable from the body housing according to the present invention referring to FIGS. 5, 6A, and 6B. FIG. 5 is a perspective view illustrating the exterior of the sliding battery pack according to the embodiment of the present invention and FIGS. 6A and 6B are frontal and rear views of the sliding battery pack shown in FIG. 5.

Figure 6A:
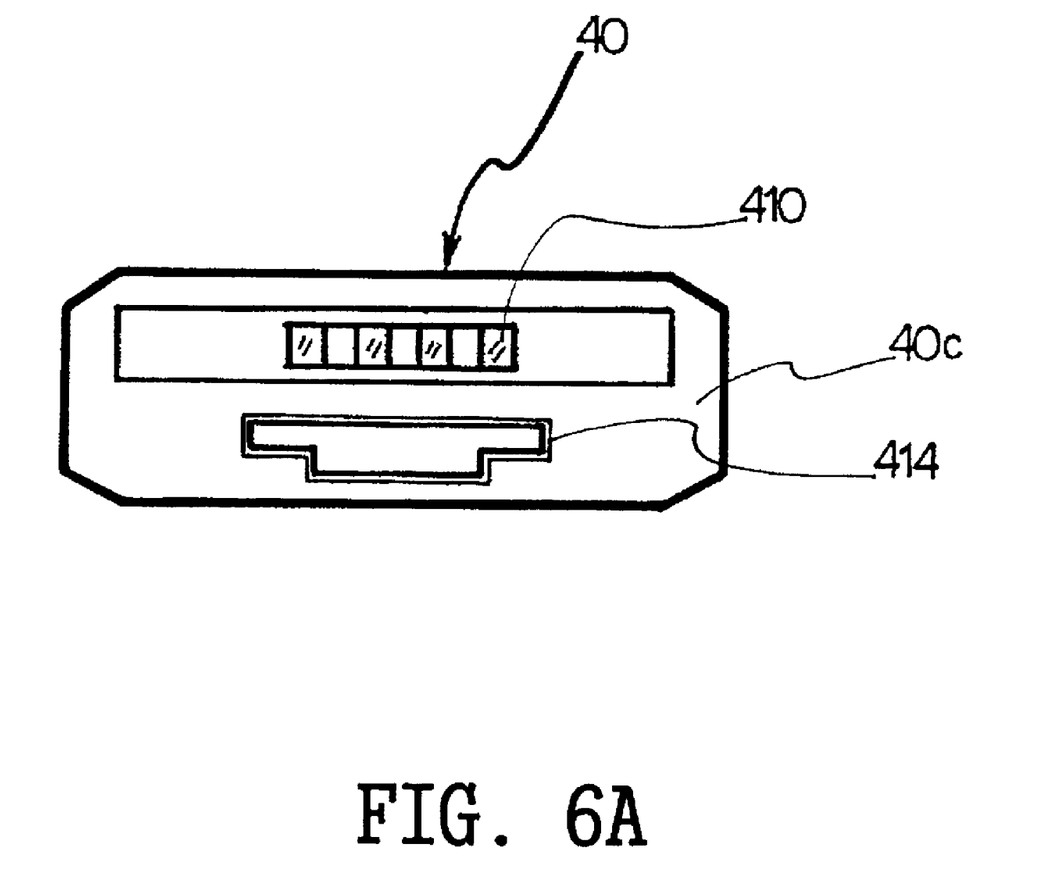
FIG. 6A is a frontal view of the battery pack shown in FIG. 5.
Figure 6B:
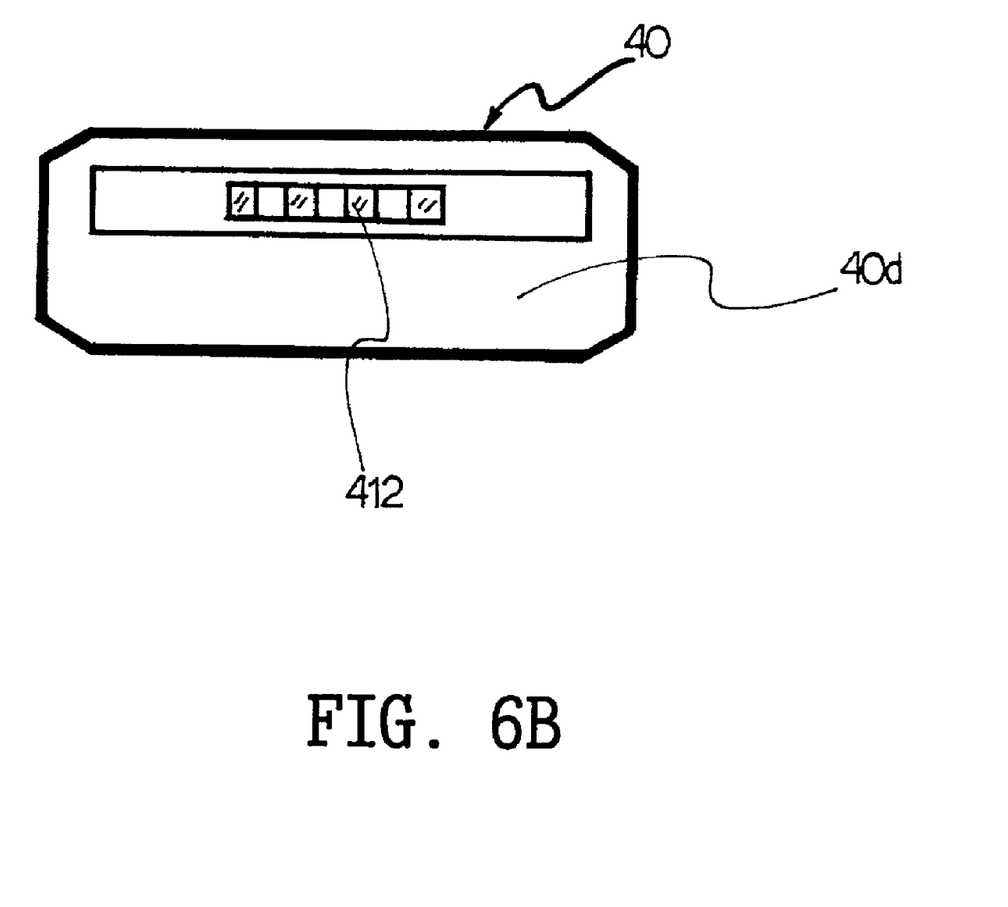
FIG. 6B is a rear view of the battery pack shown in FIG. 5.

As shown in FIGS. 5, 6A, and 6B, the sliding battery pack 40 has top and bottom ends 40a and 40b, front and rear ends 40c and 40d, and two side ends 40e and 40g. Charging port 410 is disposed on the front end 40c to recharge the battery and a female interface connector 414 is under the charging port 410 for charging by use of a male interface connector (not shown). A connection port 412 is disposed on the rear end 40d for electrically connecting to the PCB when the sliding battery pack 40 is locked in the slot of the body housing. The connection structure of the connection port 412 will be described later.

Locking grooves 40f are formed on both side ends 40e and 40g of the sliding battery pack 40 to maintain its mounted/connection state when the sliding battery pack 40 is completely inserted into the slot.

Figure 7:
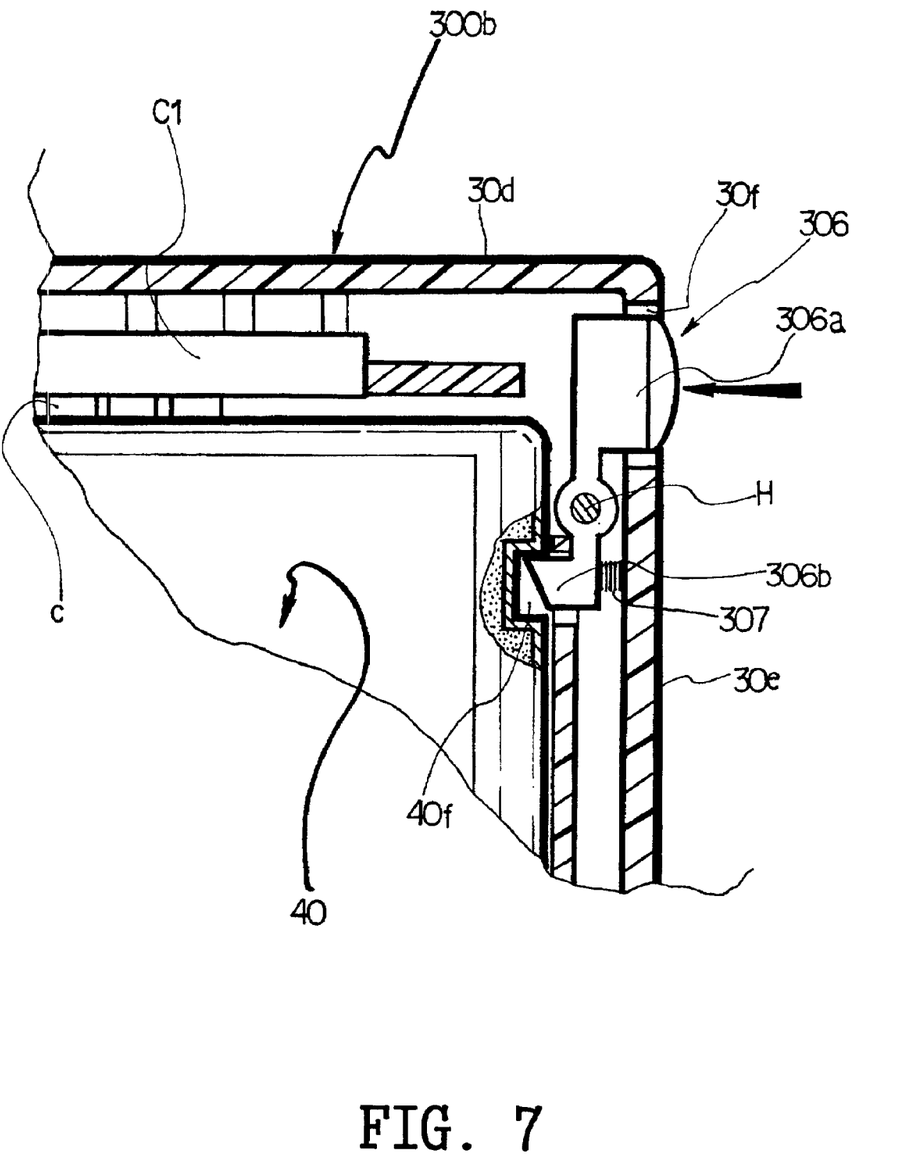
FIG. 7 is a schematic view of a locking device for the sliding battery pack according to an embodiment of the present invention.

The locking device of the sliding battery pack according to the preferred embodiment of the present invention will be described with reference to FIG. 7. As shown in FIG. 7, the locking device functions to mount the sliding battery pack 40 in the middle housing 300b and retain the battery pack 40 within the middle housing 300b. The sliding battery pack 40 has the locking grooves 40f on both ends and lockers 306 in the vicinity of the rear end of the middle housing 300b to lock the sliding battery pack 40 in the middle housing 300b in cooperation with the locking grooves 40f.

Each of the lockers 306 has a hinge shaft H. One end 306a of the locker 306 is exposed from an end 30e of the body housing 30, and the other end 306b thereof is shaped into a hook to be inserted into or removed from a locking groove 40f. An identical configuration is on end 30g. Therefore, a predetermined opening 30f is formed at the body housing end 30e and 30g to hold the end 306a of the locker 306.

When the sliding battery pack 40 is pushed into slots, the rear end 40d of the sliding battery pack 40 advances against the ends 306b of the lockers 306 which rotate slightly in the counterclockwise direction about the hinge shafts H. The ends 306b of the lockers 306 are slanted to allow ease of insertion of battery pack 40 and rotation of lockers 306 about hinge shafts H. By further pushing the sliding battery pack 40, the ends 306b of the lockers 306 rotate in the clockwise direction and insert into the locking grooves 40f. A spring 307 provides restoring force to the ends 306b of the lockers 306. The ends 306b of the lockers 306 have inclined portions to slide against the rear end of the sliding battery pack 40.

To detach the sliding battery pack 40, the ends 306a of the lockers 306 are pressed in the direction of the arrow shown in FIG. 7. The lockers 306 slightly rotate in the counterclockwise direction around the hinge shafts H and the ends 306b of the lockers 306 are completely removed from the locking grooves 40f. In this state, a user pulls the sliding battery pack 40 from the slot in the lengthwise direction.

Figure 8:
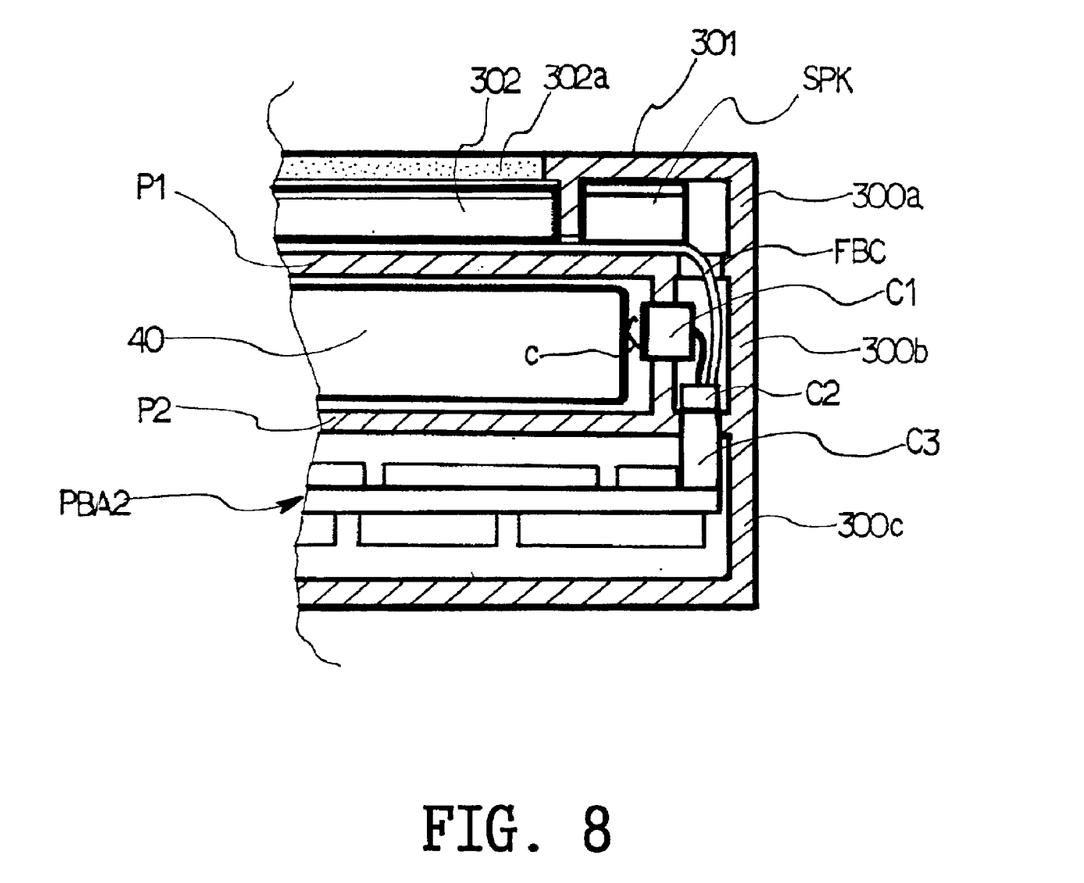
FIG. 8 is a sectional view illustrating a first connection mechanism for the sliding battery pack according to an embodiment of the present invention.

Referring to FIG. 8, the electrical connection between the sliding battery pack and the FBC and the PCB will be described. In FIG. 8, the LCD module 302 and a speaker SPK are mounted on the FBC and the sliding battery pack 40 is inserted into the middle housing 300b.

If the sliding battery pack 40 is maintained in a locked state in the slot by the lockers 306, the connection port 412 (not shown) of the sliding battery pack 40 is connected to a connection port c at the rear portion of the middle housing 300b. The connection port c is connected to a connector C3 of the PCB assembly PBA2 through connectors C1 and C2. Connector C2 connects to the FBC.

In this connection mechanism, the connector C2 connected to an end of the FBC in the upper housing 300a is connected to the connector C3 of the PCB assembly PBA2.

Figure 9:
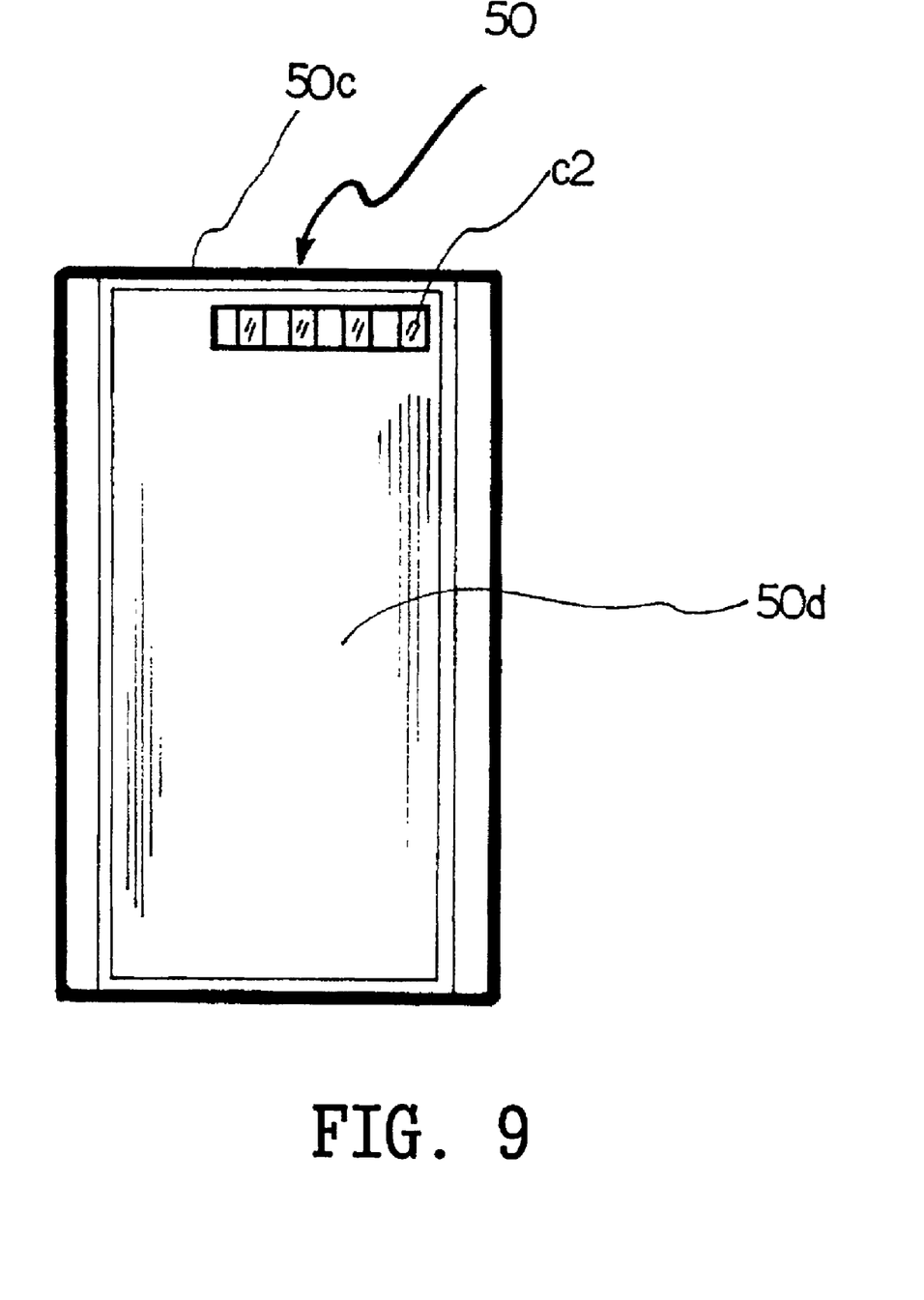
FIG. 9 is a plan view of the sliding battery pack with a connection port positioned at a bottom corner thereof according to a second embodiment of the present invention.
Figure 10:
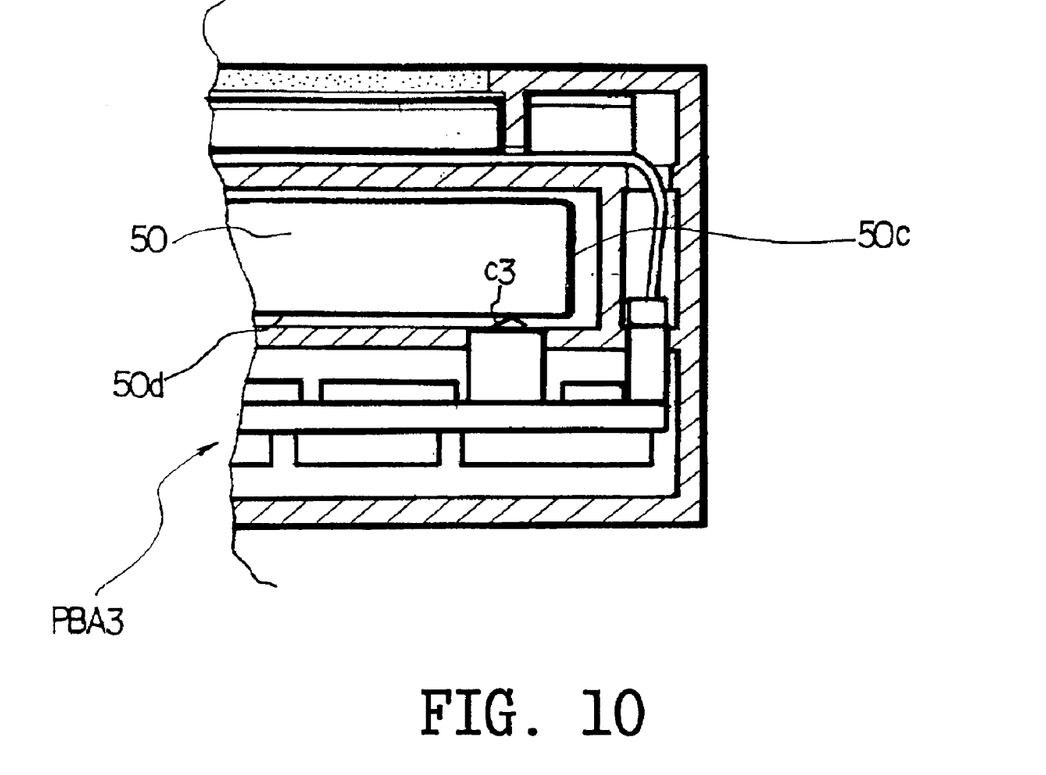
FIG. 10 is a sectional view illustrating a second connection mechanism for the sliding battery pack shown in FIG. 9.

FIG. 9 is a plan view of a sliding battery pack 50 with the connection port c2 positioned in the vicinity of a corner of the bottom end 50d according to a second embodiment of the present invention and FIG. 10 is a sectional view illustrating a second connection mechanism for the sliding battery pack shown in FIG. 9.

As shown in FIGS. 9 and 10, when the sliding battery pack 50 is inserted into the slot, the connection port c2 is connected to a protruding connection port c3 so that the sliding battery pack 50 is connected to a PCB assembly PBA3. Many variations of connecting the battery pack to the main unit are contemplated.

Consequently, heat and electromagnetic waves are blocked during a call by positioning the PCB assembly remotely from a human body.

In accordance with the present invention as described above, a battery pack for power supply is held between an upper housing and a lower housing and a PCB assembly generating electromagnetic waves is mounted on the lower housing. Therefore, the adverse effects of the electromagnetic waves are minimized. Remote position of the PCB assembly from the head of a user during a call adds to the minimization of adverse effects of the electromagnetic waves on the human body and makes it more convenient to talk on the phone.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A portable communication device, comprising:
a body housing including an upper housing with a flexible board circuit (FBC) on which a keypad is mounted, a lower housing vertically spaced from the upper housing by a predetermined distance and including a printed circuit board (PCB) assembly, and a middle housing between the upper housing and the lower housing, separated from the lower housing by a separation plate for blocking electromagnetic waves generated from the PCB assembly, and having a slot opened from an end; and a sliding battery pack insertable into said slot and attachable to and detachable from the middle housing in a lengthwise direction, for supplying power to the portable communication device.

2. The portable communication device of claim 1, wherein the sliding battery pack includes at least one connection port.

3. The portable communication device of claim 1, wherein the sliding battery pack includes at least one charging port at an exposed end when inserted into said slot and at least one connection port.

4. The portable communication device of claim 1, further comprising a locking device for locking the sliding battery pack in the slot when inserted into said slot.

5. A portable communication device comprising:
a body housing including an upper housing;
a lower housing vertically spaced a predetermined distance from the upper housing;
a middle housing between the upper housing and the lower housing, separated from the lower housing by a separation plate for blocking electromagnetic waves generated from the PCB assembly and having a slot opened from an end;
a sliding battery pack insertable into said slot and attachable to and detachable from the middle housing in a lengthwise direction, for supplying power to the portable communication device;
locking device for locking the sliding battery pack in the slot when inserted into said slot;
a locker of the locking device having two free ends with respect to a hinge shaft, one of the free ends exposed from a side end of the middle housing to be pressed externally and the other free end disposed in the middle housing to lock the sliding battery pack; and
a locking groove formed at a predetermined position of a side end of the sliding battery pack to mate with the other free end of the locker that rotates when the one free end of the locker is pressed.

6. The portable communication device of claim 5, wherein a second locking device is installed to mate with a second locking groove located at a second predetermined position on a second side and of said sliding battery pack.

7. A portable communication device, comprising:
an upper housing having a keypad;
a lower housing connected to said upper housing, said lower housing having a printed circuit board (PCB) connected to said keypad;
a battery pack connectable between said upper housing and said lower housing;
a first separation plate located between said battery pack and said lower housing for reducing a specific absorption rate (SAR) of electromagnetic waves generated from said PCB; and
a second separation plate located between said battery pack and said upper housing to further reduce the SAR generated from said PCB.

* * * * *